(12) United States Patent
Cowgill

(10) Patent No.: US 8,171,900 B2
(45) Date of Patent: May 8, 2012

(54) ENGINE INCLUDING HYDRAULICALLY ACTUATED VALVETRAIN AND METHOD OF VALVE OVERLAP CONTROL

(75) Inventor: Joel Cowgill, White Lake, MI (US)

(73) Assignee: GM Global Technology Operations LLC

( * ) Notice: Subject to any disclaimer, the term of this patent is extended or adjusted under 35 U.S.C. 154(b) by 333 days.

(21) Appl. No.: 12/685,061

(22) Filed: Jan. 11, 2010

(65) Prior Publication Data

US 2011/0168111 A1   Jul. 14, 2011

(51) Int. Cl.
   *F01L 9/02*   (2006.01)
(52) U.S. Cl. ............... 123/90.12; 123/90.13; 123/90.15; 137/625
(58) Field of Classification Search ............... 123/90.12, 123/90.13, 90.15; 137/511, 625
   See application file for complete search history.

(56) References Cited

U.S. PATENT DOCUMENTS

| | | | |
|---|---|---|---|
| 6,886,510 B2 | 5/2005 | Sun et al. | |
| 7,866,286 B2 * | 1/2011 | Sun | 123/90.12 |

* cited by examiner

*Primary Examiner* — Ching Chang
(74) *Attorney, Agent, or Firm* — Harness, Dickey & Pierce, P.L.C.

(57) ABSTRACT

An exhaust valve control method may include displacing an exhaust valve in communication with the combustion chamber of an engine to an open position using a hydraulic exhaust valve actuation system and returning the exhaust valve to a closed position using the hydraulic exhaust valve actuation assembly. During closing, the exhaust valve may be displaced for a first duration from the open position to an intermediate closing position at a first velocity by operating the hydraulic exhaust valve actuation assembly in a first mode. The exhaust valve may be displaced for a second duration greater than the first duration from the intermediate closing position to a fully closed position at a second velocity at least eighty percent less than the first velocity by operating the hydraulic exhaust valve actuation assembly in a second mode.

20 Claims, 5 Drawing Sheets

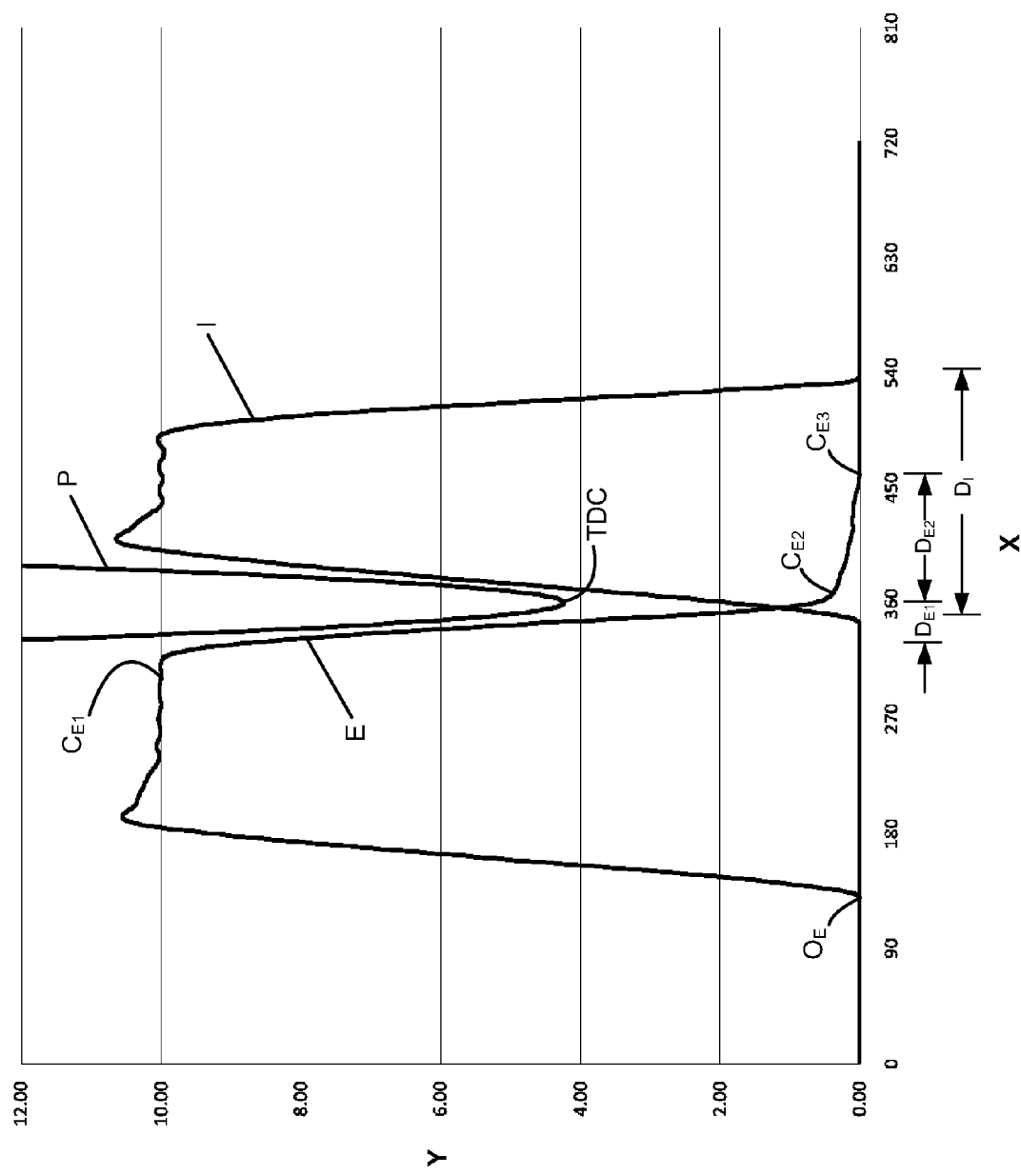

ENGINE INCLUDING HYDRAULICALLY ACTUATED VALVETRAIN AND METHOD OF VALVE OVERLAP CONTROL

GOVERNMENT LICENSE RIGHTS

The Government of the United States of America has rights in this invention pursuant to Contract No. DE-FC26-05NT42415 awarded by the United States Department of Energy.

FIELD

The present disclosure relates to engine assemblies, and more specifically to hydraulically actuated valvetrain assemblies.

BACKGROUND

This section provides background information related to the present disclosure which is not necessarily prior art.

Internal combustion engines may combust a mixture of air and fuel in cylinders and thereby produce drive torque. Air and fuel flow into and out of the cylinders may be controlled by a valvetrain. The valvetrain may include a hydraulic system that actuates intake and exhaust valves and thereby controls the timing and amount of air and fuel entering the cylinders and exhaust gases leaving the cylinders.

SUMMARY

An engine assembly may include an engine structure, a piston, a crankshaft, a hydraulically actuated intake valve assembly and a hydraulically actuated exhaust valve assembly. The engine structure may define a combustion chamber and intake and exhaust ports may be in communication with the combustion chamber. The piston may be located within the combustion chamber and displaceable from a bottom dead center position to a top dead center position during an exhaust stroke and from the top dead center position to the bottom dead center position during an intake stroke immediately subsequent the exhaust stroke. The crankshaft may be supported by the engine structure and rotationally driven by the piston. The hydraulically actuated intake valve assembly may be supported by the engine structure and may include an intake valve and an intake valve actuation assembly adapted to open the intake valve during the intake stroke. The hydraulically actuated exhaust valve assembly may be supported by the engine structure and may include an exhaust valve and an exhaust valve actuation assembly adapted to open the exhaust valve during the exhaust stroke. The exhaust valve actuation assembly may be operable in a first mode during an initial portion of exhaust valve closing and may be operable in a second mode during a final portion of exhaust valve closing. The final portion may have a duration greater than a duration of the initial portion. The exhaust valve may close at a first velocity during the initial portion at least five times greater than a second velocity of the exhaust valve during the final portion.

An exhaust valve control method may include displacing an exhaust valve in communication with the combustion chamber of an engine to an open position using a hydraulic exhaust valve actuation system and returning the exhaust valve to a closed position using the hydraulic exhaust valve actuation assembly. During closing, the exhaust valve may be displaced for a first duration from the open position to an intermediate closing position at a first velocity by operating the hydraulic exhaust valve actuation assembly in a first mode. The exhaust valve may be displaced for a second duration greater than the first duration from the intermediate closing position to a fully closed position at a second velocity at least eighty percent less than the first velocity by operating the hydraulic exhaust valve actuation assembly in a second mode.

The hydraulic exhaust valve actuation assembly may define a first control chamber containing pressurized fluid displacing the exhaust valve against a closing force applied by a biasing member. Displacing the exhaust valve for the first duration at a first velocity may include operating the first control chamber at a first operating pressure. Displacing the exhaust valve for the second duration at the second velocity may include operating the first control chamber at a second operating pressure greater than the first operating pressure.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 5 is a graphical illustration of the valve opening provided by the hydraulic valvetrain assembly of FIG. 1.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
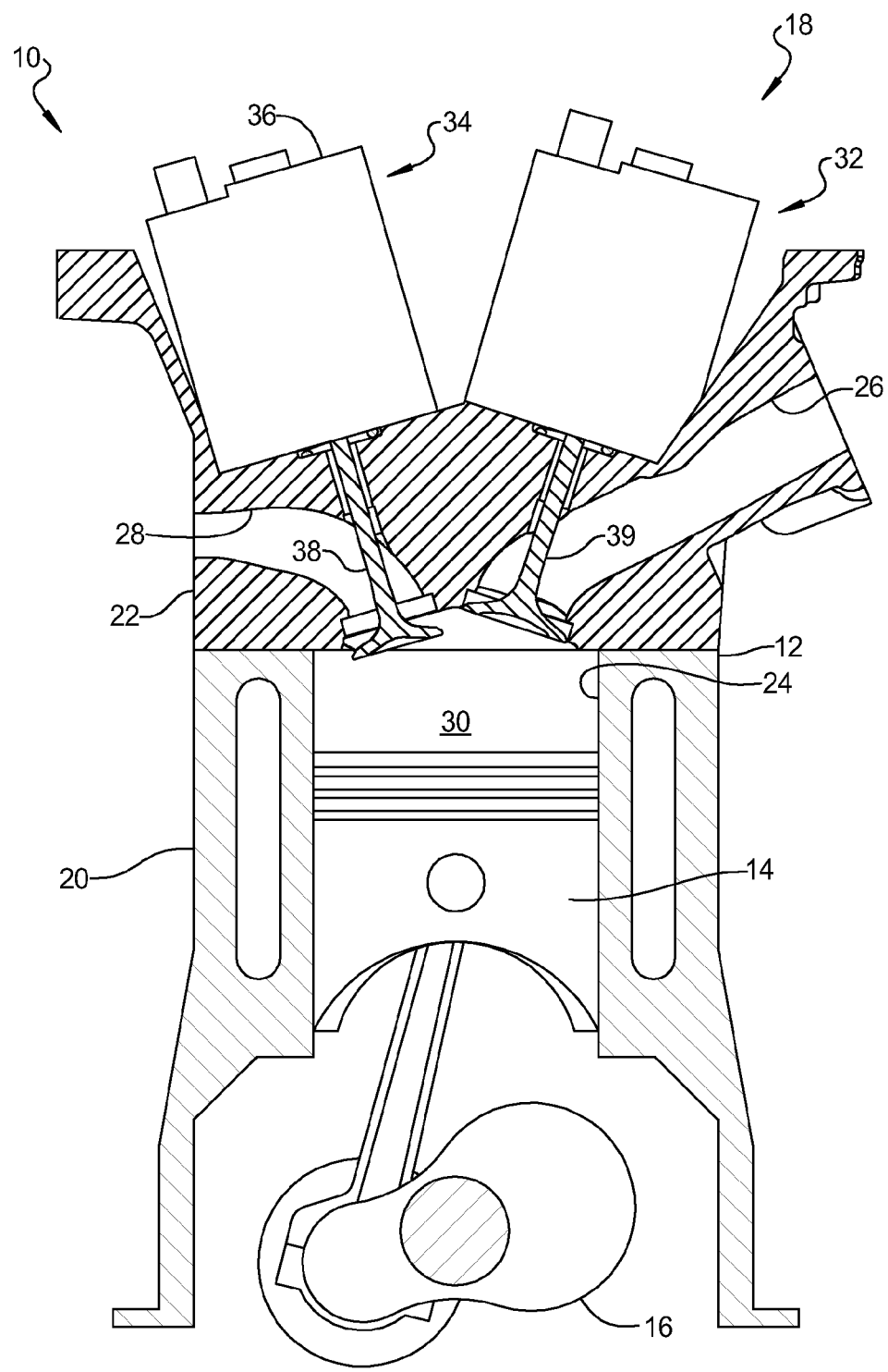
FIG. 1 is a schematic section view of an engine assembly according to the present disclosure.

With reference to FIG. 1, an engine assembly 10 is schematically illustrated. The engine assembly 10 may include an engine structure 12, pistons 14 (one shown), a crankshaft 16, and a valvetrain assembly 18. The engine structure 12 may include an engine block 20 and a cylinder head 22. The engine block 20 may define cylinder bores 24. The pistons 14 may be engaged with the crankshaft 16 and located within the cylinder bores 24. A single piston 14 and cylinder bore 24 is illustrated for simplicity. However, it is understood that the present disclosure applies equally to any number of piston-cylinder arrangements, as well as engine configurations including, but not limited to, inline and V-configurations.

The cylinder head 22 may be engaged with the engine block 20 and may define intake and exhaust ports 26, 28. The piston 14, the cylinder bore 24 and the cylinder head 22 may cooperate to define a combustion chamber 30. The valvetrain assembly 18 may be supported by the engine structure 12 and may selectively provide communication between the intake and exhaust ports 26, 28 and the combustion chamber 30.

The valvetrain assembly 18 may include a hydraulically actuated intake valve assembly 32 and a hydraulically actuated exhaust valve assembly 34. The structure of the hydraulically actuated intake and exhaust valve assemblies 32, 34 may be generally similar. Therefore, the hydraulically actuated exhaust valve assembly 34 will be described below with the understanding that the description applies equally to the hydraulically actuated intake valve assembly 32.

Figure 2:
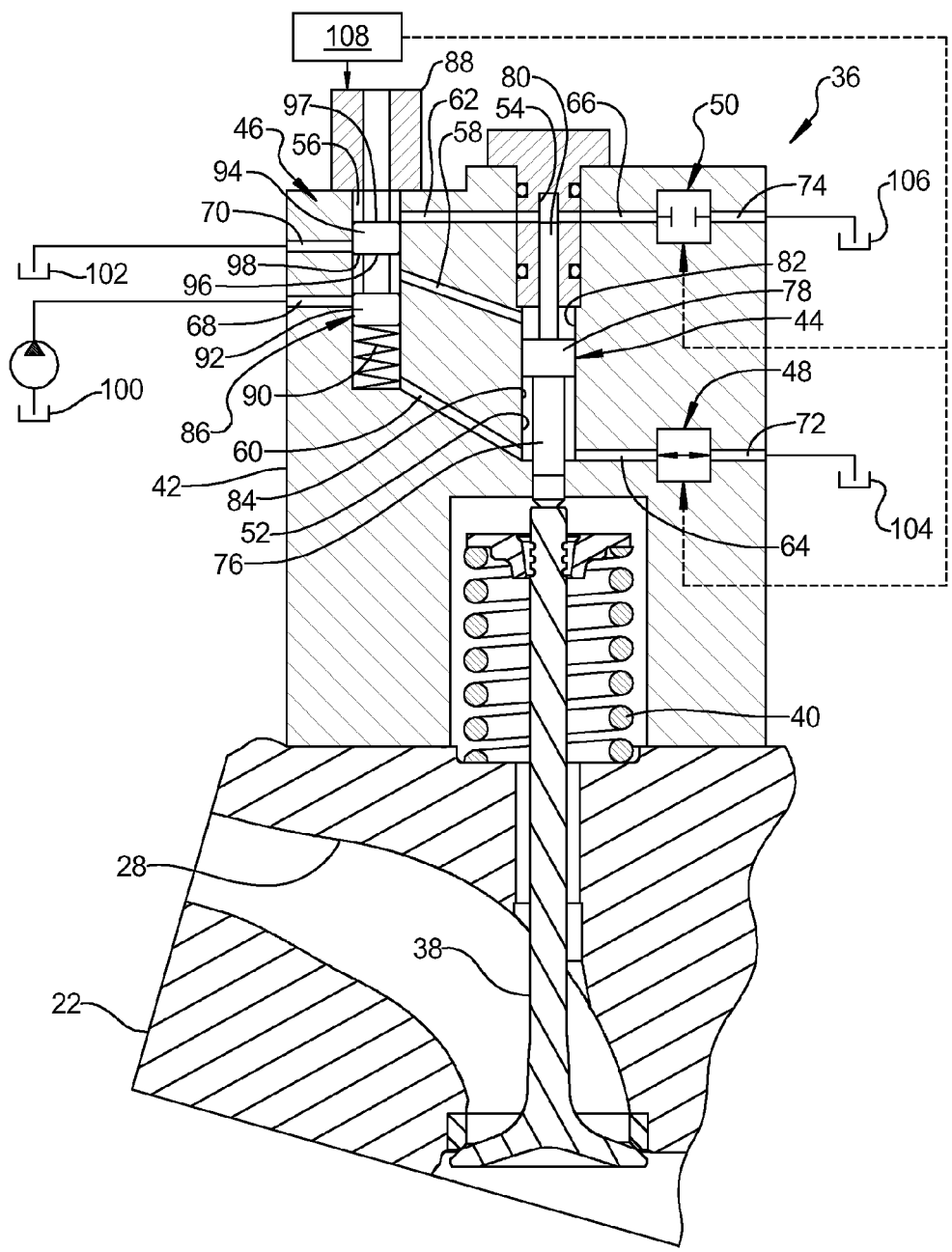
FIG. 2 is a schematic illustration of the hydraulic valvetrain assembly shown in FIG. 1 in a first operating condition.
Figure 3:
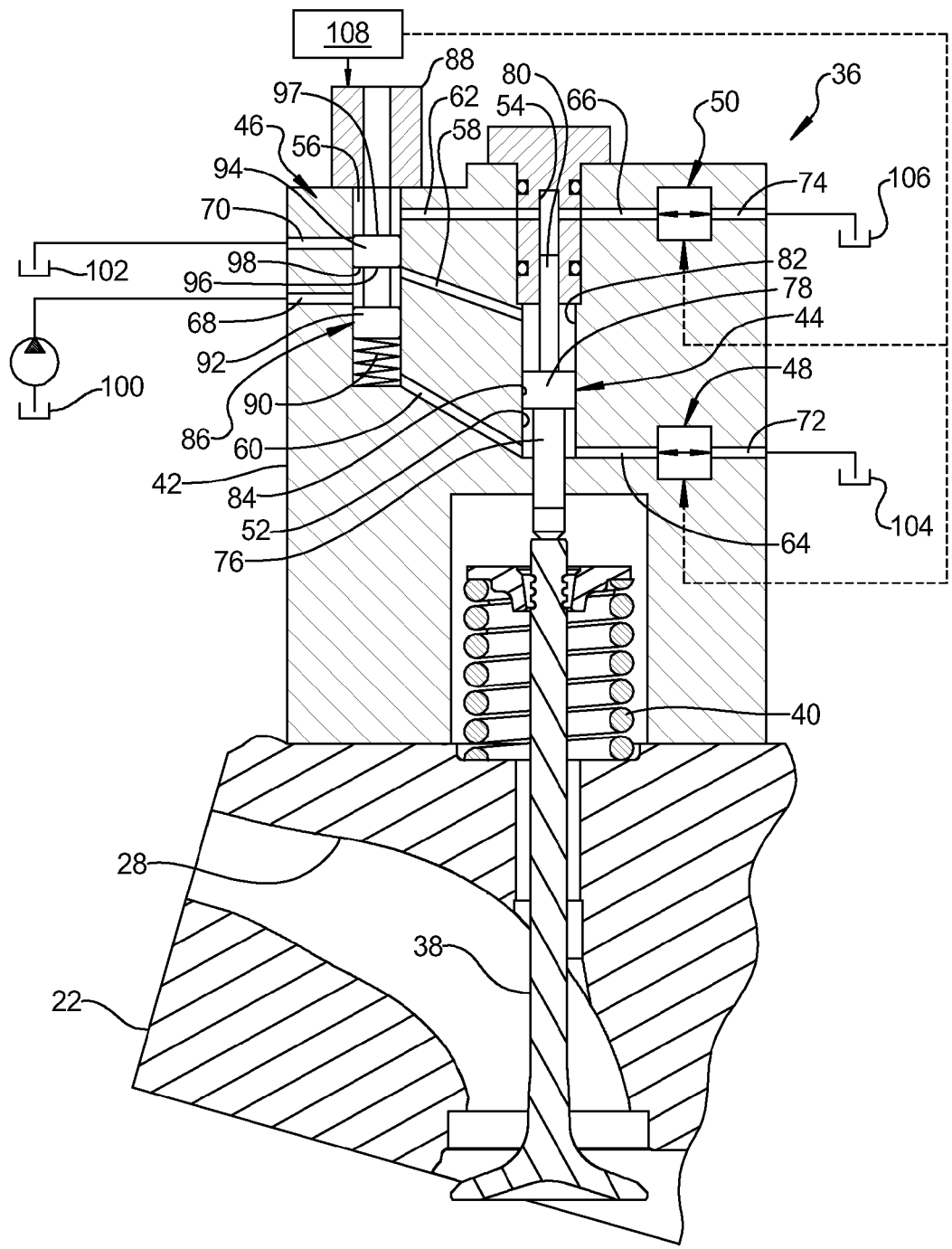
FIG. 3 is a schematic illustration of the hydraulic valvetrain assembly shown in FIG. 1 in a second operating condition.
Figure 4:
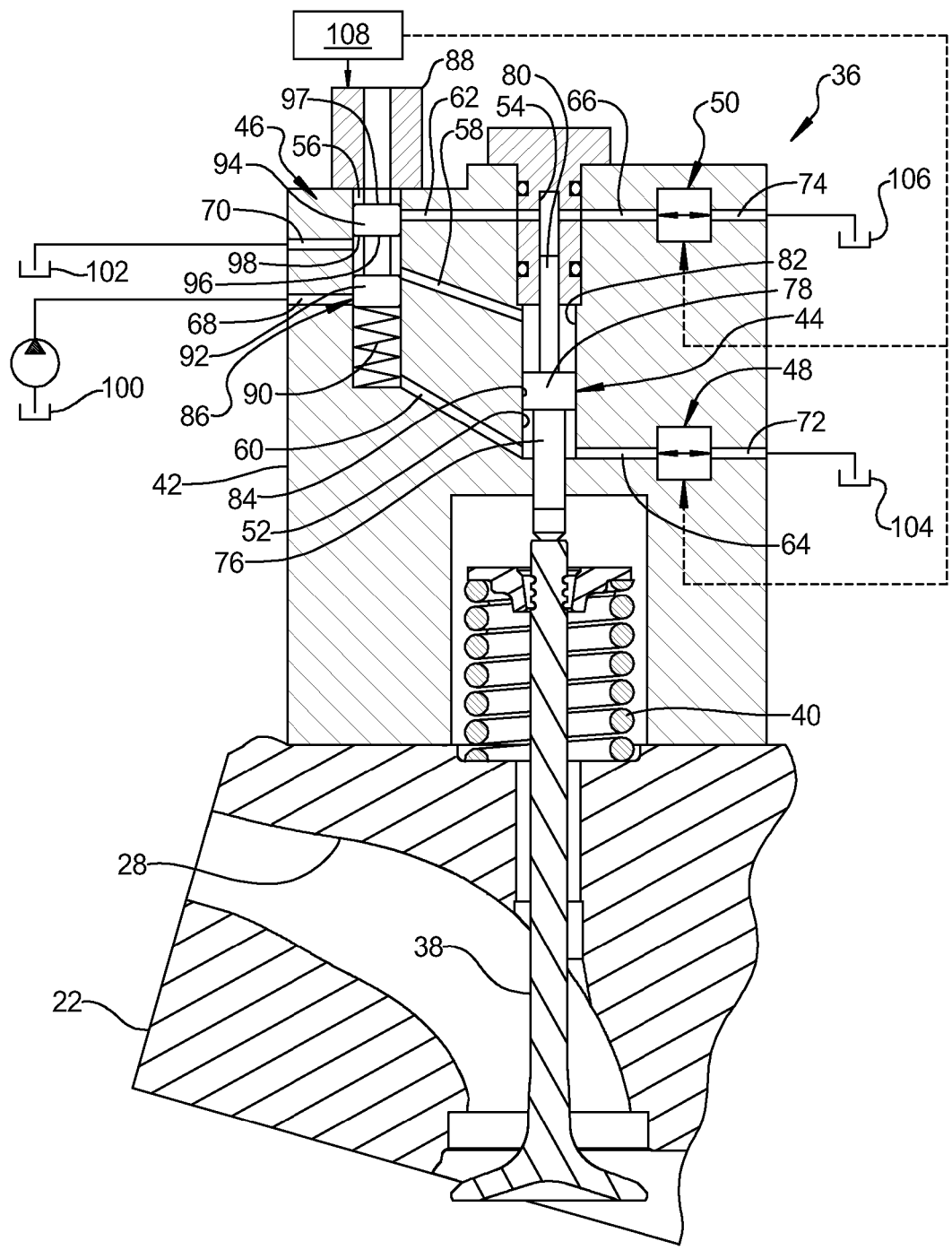
FIG. 4 is a schematic illustration of the hydraulic valvetrain assembly shown in FIG. 1 in a third operating condition.

With additional reference to FIGS. 2-4, the hydraulically actuated exhaust valve assembly 34 may include an actuation assembly 36, an exhaust valve 38 and a biasing member 40. As indicated above, the hydraulically actuated intake valve assembly 32 may be similar, but may include an intake valve 39 (FIG. 1) in place of the exhaust valve 38. The actuation assembly 36 may include a housing 42, an actuation member 44 and first, second, and third valve assemblies 46, 48, 50. The housing 42 may define first, second, and third fluid chambers 52, 54, 56, first, second, third, fourth and fifth passages 58, 60, 62, 64, 66, and first, second, third and fourth ports 68, 70, 72, 74. The actuation member 44 may include a first portion 76 engaged with the exhaust valve 38, a second portion 78 located within the first fluid chamber 52 and a third portion 80 located in the second fluid chamber 54. The second portion 78 of the actuation member 44 may separate the first chamber into first and second regions 82, 84. The third portion 80 may form a control piston.

The first passage 58 may extend from the first region 82 of the first fluid chamber 52 to the third fluid chamber 56, the second passage 60 may extend from the second region 84 of the first fluid chamber 52 to the third fluid chamber 56, and the third passage 62 may extend from the second fluid chamber 54 to the third fluid chamber 56. The fourth passage 64 may extend from the second region 84 of the first fluid chamber 52 to the second valve assembly 48 and the fifth passage 66 may extend from the second fluid chamber 54 to the third valve assembly 50.

The first valve assembly 46 may include a spool valve 86, a solenoid 88 engaged with the spool valve 86 and a biasing member 90 engaged with the spool valve 86. The spool valve 86 may form a control valve and may be located in the third fluid chamber 56 and may include first and second spool portions 92, 94. An end 96 of the second spool portion 94 facing the first spool portion 92 may include an outer edge defining a contoured surface 98. An end 97 of the second spool portion 94 opposite the end 96 may be in communication with the second fluid chamber 54 via the third passage 62. The first port 68 may be in communication with a pressurized fluid supply 100. The second, third and fourth ports 70, 72, 74 may be in communication with low pressure tanks 102, 104, 106, respectively. The tanks 102, 104, 106 may form individual fluid reservoirs or may be combined to form a single fluid reservoir. The third port 72 may be in communication with the second valve assembly 48 and the fourth port 74 may be in communication with the third valve assembly 50.

A control module 108 may be in communication with the solenoid 88 and may selectively displace the spool valve 86, as discussed below. The control module 108 may additionally be in communication with the second and third valve assemblies 48, 50 and may command the second and third valve assemblies 48, 50 between open and closed positions. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

During operation, the exhaust valve 38 may be displaced between opened and closed positions by the actuation assembly 36. The exhaust valve 38 may be displaced from a closed position (FIG. 2) to an opened position (FIG. 3) by energizing the solenoid 88 via the control module 108 and displacing the spool valve 86 against the force of the biasing member 90 from a first position (FIG. 2) to a second position (FIG. 3). When the exhaust valve 38 is in the closed position, the spool valve 86 is in the first position where the first spool portion 92 of the spool valve 86 isolates the first port 68, and therefore the pressurized fluid supply 100, from communication with the first region 82 of the first fluid chamber 52 allowing the biasing member 40 to maintain the exhaust valve 38 in the closed position.

As indicated above, the exhaust valve 38 may be displaced to the open position by energizing the solenoid 88 and displacing the spool valve 86 against the force of the biasing member 90 to provide communication between the pressurized fluid supply 100 and the first region 82 of the first fluid chamber 52. The control module 108 may command the second and third valve assemblies 48, 50 to an open position when the solenoid 88 is energized, providing communication between the second region 84 of the first fluid chamber 52 and the low pressure tank 104 and between the second fluid chamber 54 and the low pressure tank 106. The pressurized fluid provided by the pressurized fluid supply 100 may act on the second portion 78 of the actuation member 44, displacing the actuation member 44 and the exhaust valve 38 against the force of the biasing member 40 to open the exhaust valve 38. The second spool portion 94 may isolate the first region 82 of the first fluid chamber 52 from the low pressure tank 102 when the solenoid 88 is energized.

In order to close the exhaust valve 38, the solenoid 88 may be de-energized and the biasing member 90 may displace the spool valve 86 to a third position (FIG. 4). The first spool portion 92 may isolate the first region 82 of the first fluid chamber 52 from the pressurized fluid supply 100 when the solenoid 88 is de-energized and the spool valve 86 is in the third position. The second and third valve assemblies 48, 50 may both initially be in the open position when the solenoid 88 is de-energized, allowing generally unrestricted fluid flow from the second region 84 of the first fluid chamber 52 to the low pressure tank 104 and from the second fluid chamber 54 to the low pressure tank 106. The biasing member 40 may then force the exhaust valve 38 to the closed position.

The actuation assembly 36 may control the end portion of exhaust valve closing by commanding the third valve assembly 50 to the closed position (FIG. 2). When the third valve assembly 50 is closed, the biasing member 40 displaces the actuation member 44 and forces the fluid trapped in the second fluid chamber 54 into the third fluid chamber 56. The displaced fluid acts on the second spool portion 94 of the spool valve 86, displacing the spool valve 86 from the third position (FIG. 4) to the first position (FIG. 2). As the spool valve 86 is displaced from the third position to the first position, the second spool portion 94 may close off communication between the low pressure tank 102 and the first region 82 of the first fluid chamber 52.

By way of non-limiting example, the contoured surface 98 of the second spool portion 94 may provide a predetermined profile for valve closing by restricting flow out of the first region 82 of the first fluid chamber 52. The increasing restriction may provide an increasing force on the second portion 78 of the actuation member 44 acting opposite the force provided by the biasing member 40. The increased force applied by fluid within the first region 82 of the first fluid chamber 52 may reduce closing velocity of the exhaust valve 38.

FIG. 5 is a non-limiting graphical illustration of exhaust valve closing according to the present disclosure. As seen in FIG. 5, non-limiting examples of intake and exhaust valve opening profiles (I, E) relative to piston position (P) are illustrated. The exhaust valve 38 may open at point ($O_E$). The opening point ($O_E$) may generally correspond to the operating condition of the actuation assembly 36 where the second valve assembly 50 is opened and the solenoid 88 is energized to displace the spool valve 86 from the first position (FIG. 2) to the second position (FIG. 3).

The exhaust valve 38 may begin closing at an initial position ($C_{E1}$) by de-energizing the solenoid 88 to allow the biasing member 90 to displace the spool valve 86 to the third position (FIG. 4). The exhaust valve 38 may be displaced to the closed position at a first velocity ($V_1$) when the spool valve 86 is in the third position and the second valve assembly 50 is in the open position. The first velocity ($V_1$) of exhaust valve closing may be reduced at an intermediate closing position ($C_{E2}$) by closing the second valve assembly 50. When the second valve assembly 50 is closed, the actuation member 44 forces fluid from the second fluid chamber 54 into the third fluid chamber 56 displacing the spool valve 86 from the third position (FIG. 4) to the first position (FIG. 2) against the force of the biasing member 90.

As the spool valve 86 is displaced, the second spool portion 94 closes the first port 70, increasing the restriction in the flow path from the first region 82 of the first fluid chamber 52 to the low pressure tank 102. When the restriction is increased, pressure within the first region 82 of the first fluid chamber 52 increases, creating increased force acting against the biasing member 40 and thereby reducing the exhaust valve closing velocity. By way of non-limiting example, the second velocity ($V_2$) of the exhaust valve 38 from the intermediate closing position ($C_{E2}$) to a final closing position ($C_{E3}$) may include a predetermined value based on the contoured surface 98 of the second spool portion 94. The contoured surface 98 may generally provide a controlled transition between a fully opened first port 70 and a closed first port 70.

As seen in FIG. 5, the first velocity ($V_1$) may be greater than the second velocity ($V_2$). By way of non-limiting example, the first velocity ($V_1$) may be at least five times greater than the second velocity ($V_2$), and more specifically at least ten times greater than the second velocity ($V_2$). The intermediate closing position ($C_{E2}$) may be located after an opening point ($O_I$) of the intake valve 39 immediately subsequent the opening of the exhaust valve 38. Therefore, the final closing position ($C_{E3}$) may be located after the opening point ($O_I$) of the intake valve 39 as well, providing an overlap between the exhaust valve 38 and intake valve 39 openings. By way of non-limiting example, the final closing position ($C_{E3}$) may be located at least twenty-five degrees of crankshaft rotation past the opening point ($O_I$) of the intake valve 39, and more specifically between thirty-five and one hundred degrees of crankshaft rotation past the opening point ($O_I$).

Additionally, as seen in FIG. 5, a first closing duration ($D_{E1}$) may be defined between the initial position and intermediate closing position ($C_{E1}, C_{E2}$) and a second closing duration ($D_{E2}$) may be defined between the intermediate and final closing positions ($C_{E2}, C_{E3}$). The second closing duration ($D_{E2}$) may be greater than the first closing duration ($D_{E1}$). By way of non-limiting example, the second closing duration ($D_{E2}$) may be at least 1.5 times the first closing duration ($D_{E1}$), and more specifically at least twice the first closing duration ($D_{E1}$). By way of non-limiting example, the second closing duration ($D_{E2}$) may be at least ten percent of an opening duration ($D_I$) of the intake valve 39, and more specifically between twenty and twenty-five percent of the opening duration ($D_I$).

The intermediate closing position ($C_{E2}$) may be defined at a lift of less than ten percent of a maximum lift of the exhaust valve 38. By way of non-limiting example, the intermediate closing position ($C_{E2}$) may be defined at a lift of less than 1.0 millimeters (mm).

A top dead center (TDC) position of the piston 14 during an exhaust stroke of the piston 14 may be located between the opening point ($O_I$) of the intake valve 39 and the final closing position ($C_{E3}$) of the exhaust valve 38. The intermediate closing position ($C_{E2}$) of the exhaust valve 38 may be located after the piston 14 reaches TDC. By way of non-limiting example, the final closing position ($C_{E3}$) may be located at least twenty-five degrees of crankshaft rotation past TDC of the piston 14, and more specifically between thirty-five and one hundred degrees of crankshaft rotation past TDC of the piston 14.

What is claimed is:

1. An engine assembly comprising:
    an engine structure defining a combustion chamber and intake and exhaust ports in communication with the combustion chamber;
    a piston located within the combustion chamber and displaceable from a bottom dead center position to a top dead center position during an exhaust stroke and from the top dead center position to the bottom dead center position during an intake stroke immediately subsequent the exhaust stroke;
    a crankshaft supported by the engine structure and rotationally driven by the piston;
    a hydraulically actuated intake valve assembly supported by the engine structure and including an intake valve and an intake valve actuation assembly adapted to open the intake valve during the intake stroke; and
    a hydraulically actuated exhaust valve assembly supported by the engine structure and including an exhaust valve and an exhaust valve actuation assembly adapted to open the exhaust valve during the exhaust stroke, the exhaust valve actuation assembly operable in a first mode during an initial portion of exhaust valve closing and operable in a second mode during a final portion of exhaust valve closing, the final portion having a duration greater than a duration of the initial portion and the exhaust valve closing at a first velocity during the initial portion at least 5 times greater than a second velocity of the exhaust valve during the final portion.

2. The engine assembly of claim 1, further comprising a biasing member urging the exhaust valve to the closed position, the exhaust valve actuation assembly defining a first control chamber containing pressurized fluid acting on the exhaust valve against a closing force provided by the biasing member, the first control chamber containing fluid at a first operating pressure during the initial portion of exhaust valve closing and containing fluid at a second operating pressure greater than the first operating pressure during the final portion of exhaust valve closing.

3. The engine assembly of claim 2, wherein the exhaust valve actuation assembly includes a first flow restriction from the first control chamber to a tank during the first mode and includes a second flow restriction from the first control chamber to the tank greater than the first flow restriction during the second mode to provide the second operating pressure and second velocity.

4. The engine assembly of claim 3, wherein the exhaust valve actuation assembly defines a second control chamber and a control piston located within the second control chamber and coupled to the exhaust valve for axial displacement therewith, the second control chamber containing pressurized fluid acting on the control piston against the closing force provided by the biasing member.

5. The engine assembly of claim 4, wherein the first and second flow restrictions are created by a control valve closing a flow path from the first control chamber to the tank, the control valve being in communication with the second control chamber and being displaced from a first position during the first mode to a second position during the second mode by the control piston displacing fluid in the second control chamber to apply a force to the control valve.

6. The engine assembly of claim 1, wherein the initial portion of exhaust valve closing is defined between an initial position where the exhaust valve begins to close and an intermediate closing position and the final portion of exhaust valve closing is defined between the intermediate closing position and a final position where the exhaust valve is fully closed.

7. The engine assembly of claim 6, wherein the intermediate closing position occurs during the intake stroke of the piston.

8. The engine assembly of claim 6, wherein the duration of the final portion of exhaust valve closing is at least 50 percent greater than the duration of the initial portion of exhaust valve closing.

9. The engine assembly of claim 6, wherein the intermediate closing position defines an exhaust valve lift of less than 1.0 millimeter.

10. The engine assembly of claim 6, wherein the final position is at least 25 degrees of crankshaft rotation past the opening of the intake valve.

11. The engine assembly of claim 6, wherein the final position is at least 25 degrees of crankshaft rotation past the top dead center position of the piston between the exhaust and intake strokes.

12. A method comprising:
   displacing an exhaust valve in communication with a combustion chamber of an engine to an open position using a hydraulic exhaust valve actuation assembly;
   displacing the exhaust valve for a first duration from the open position to an intermediate closing position at a first velocity by operating the hydraulic exhaust valve actuation assembly in a first mode; and
   displacing the exhaust valve for a second duration greater than the first duration from the intermediate closing position to a fully closed position at a second velocity less than 20 percent of the first velocity by operating the hydraulic exhaust valve actuation assembly in a second mode.

13. The method of claim 12, wherein the intermediate position occurs during an intake stroke of a piston located in the combustion chamber.

14. The method of claim 12, wherein the second duration is at least 50 percent greater than the first duration.

15. The method of claim 12, further comprising opening an intake valve in communication with the combustion chamber, the engine including a piston located within the combustion chamber and rotationally driving an engine crankshaft, the fully closed position being at least 25 degrees of crankshaft rotation past the opening of the intake valve.

16. The method of claim 12, further comprising opening an intake valve in communication with the combustion chamber, the engine including a piston located within the combustion chamber and rotationally driving an engine crankshaft, the fully closed position being at least 25 degrees of crankshaft rotation past a top dead center position of the piston between an exhaust stroke and an intake stroke.

17. A method comprising:
   displacing an exhaust valve in communication with a combustion chamber of an engine to an open position against a closing force applied by a biasing member using a hydraulic exhaust valve actuation assembly, the hydraulic exhaust valve actuation assembly defining a first control chamber containing pressurized fluid displacing the exhaust valve against the closing force;
   displacing the exhaust valve for a first duration from the open position to an intermediate closing position at a first velocity by operating the hydraulic exhaust valve actuation assembly in a first mode where the first control chamber contains fluid at a first operating pressure; and
   displacing the exhaust valve for a second duration greater than the first duration from the intermediate closing position to a fully closed position at a second velocity less than 20 percent of the first velocity by operating the hydraulic exhaust valve actuation assembly in a second mode where the first control chamber contains fluid at a second operating pressure greater than the first operating pressure.

18. The method of claim 17, wherein the displacing the exhaust valve for the first duration at the first velocity includes providing a first flow restriction from the first control chamber to a tank and the displacing the exhaust valve for the second duration at the second velocity includes providing a second flow restriction from the first control chamber to the tank greater than the first flow restriction to provide the second operating pressure.

19. The method of claim 18, wherein the hydraulic exhaust valve actuation assembly defines a second control chamber and a control piston located within the second control chamber and coupled to the exhaust valve for axial displacement therewith, the second control chamber containing pressurized fluid acting on the control piston against the closing force provided by the biasing member, the control piston displacing fluid within the second chamber to displace a control valve in communication with the second control chamber and provide the first and second flow restrictions.

20. The method of claim 19, wherein the control valve closes a flow path from the first control chamber to the tank as the exhaust valve is displaced from the intermediate closing position to the fully closed position.

\* \* \* \* \*